Sept. 14, 1937.                M. HESS                 2,092,878
                            STIRRING SPOON
                         Filed July 13, 1936
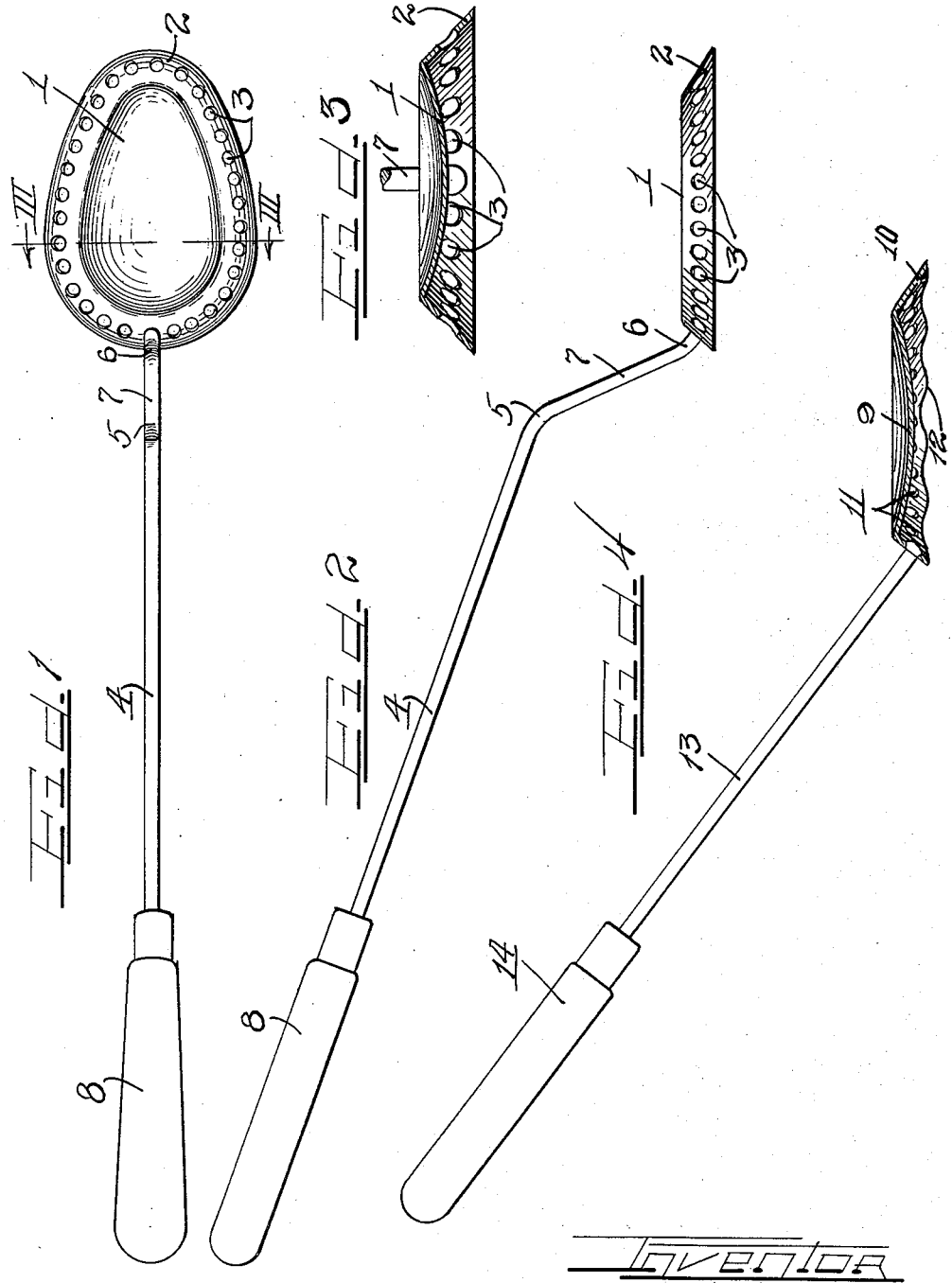
Inventor
Margaret Hess Patented Sept. 14, 1937

2,092,878

UNITED STATES PATENT OFFICE 2,092,878

STIRRING SPOON

Margaret Hess, Morocco, Ind.

Application July 13, 1936, Serial No. 90,319

7 Claims. (Cl. 30—169)

The present invention relates to an improved type of cooking spoon, and more particularly to a no-scorch stirring spoon constructed to obviate scorching by means of an improved apertured rim supporting bowl adapted to be conveniently moved about within a cooking utensil, by means of an inclined or an offset handle arrangement, with the edge of the bowl rim adapted to serve as a scraping and a stirring member when the bowl is positioned in a horizontal position within the cooking utensil and is moved about over the inner surface of the utensil bottom by means of the inclined or offset handle.

It is an object of this invention to provide a simplified and improved cooking spoon constructed to reduce the possibility of scorching of food during the process of cooking the same.

It is also an object of this invention to provide a cooking spoon wherein the bowl is provided with a supporting flange arranged to support the bottom of the bowl above a heated surface on which the rim of the bowl is seated to lessen the possibility of scorching the contents of the bowl.

It is a further object of this invention to provide a stirring spoon, the bowl portion of which is provided with a downwardly directed flange having apertures therein to serve as ventilating means for the space below the bowl when the bowl flange rests upon a heated surface.

Another object of the invention is to provide an improved cooking spoon wherein an inclined handle is connected with an apertured rim surrounding a bowl, allowing articles to be placed in or removed from a cooking utensil by holding the bowl in a substantially horizontal position and allowing passage of the liquid in the cooking utensil to take place through the apertures in the rim portion of the bowl.

An important object of the invention is the provision of an improved and simplified form of stirring spoon constructed to obviate scorching in the melting of substances or in the cooking of foods, by constructing the stirring spoon with an inclined or offset handle one end of which is attached to an apertured downwardly directed rim integrally formed around the spoon bowl, and of a depth to hold the bottom surface of the bowl above the plane of the supporting edge of the bowl rim.

Other and further important objects of this invention will be apparent from the disclosures in the specification and the accompanying drawing.

The invention (in a preferred form) is illustrated in the drawing and hereinafter more fully described.

On the drawing:

Figure 1 is a top plan view of an improved type of no-scorch stirring spoon embodying the principles of this invention.

Figure 2 is a side elevation of the same spoon shown in Figure 1.

Figure 3 is a transverse detailed section of the stirring spoon bowl, taken on the line III—III of Figure 1.

Figure 4 is a side view of a modified form of no-scorch stirring spoon, showing the bowl in longitudinal section and the modified form of handle in elevation.

As shown on the drawing:

The improved no-scorch stirring spoon of this invention comprises a concave metal bowl 1, of any desired shape, having integrally formed on the margin thereof a downwardly directed or inclined supporting flange 2 provided with a row of spaced openings or apertures 3. The bottom edge of the supporting rim 2 is adapted to serve as a contacting support to seat upon the inner surface of the bottom of a cooking utensil or upon the top surface of a heating device or stove, so that the bottom surface of the spoon bowl 1 is positioned above or spaced from the surface on which the spoon rim 2 is seated.

The stirring spoon bowl 1 and the rim 2 are constructed of metal and may be chromium plated, enameled or otherwise finished as desired.

Rigidly secured to the spoon flange 2 adjacent one end of the bowl is the lower end of a metal stem or arm 4 which, as clearly illustrated in Figure 2, is disposed at an angle with respect to the plane of the spoon bowl. The metal stem or arm 4 is deflected at points 5 and 6 to provide a more sharply inclined section 7 closely adjacent the spoon bowl. Secured on the other end of the stem or arm 4 is a spoon handle 8 constructed of wood or an insulation material. The offset section 7 in the arm 4 permits the bowl 1 to be projected into a cooking utensil in a horizontal position and allowing the flange 2 to have the supporting edge thereof engaged against the inner surface of the bottom of the cooking utensil to allow stirring of the contents of the utensil, thereby obviating scorching of the food which is being cooked.

The apertures 3 in the rim 2 permit the contents of the cooking utensil to circulate or be strained through the apertures 3 as the spoon bowl is moved around within the cooking utensil.

In the customary type of cooking and stirring spoon, the handle is substantially straight and offset only slightly with respect to the plane of the spoon bowl so that when the spoon is inserted into a cooking utensil, only the forward or advance edge of the spoon bowl may be used to scrape the inner face of the bottom of the cooking utensil. The improved construction of the bowl of the present invention with its supporting flange or rim 2 affords an arrangement whereby the entire supporting edge of the flange 2 may be so positioned that a large quantity of the contents of the cooking utensil may be agitated and a larger portion of the inner surface of the bottom of the cooking utensil may be scraped or gone over at the same time, thus greatly reducing the possibility of scorching of the contents of the cooking utensil.

The improved form of no-scorch stirring spoon illustrated in Figures 1 to 3 may also be conveniently adapted for the purpose of melting substances placed in the bowl 1 by simply positioning the supporting edge of the rim 2 upon the top surface of a stove or other heated plate to hold the bottom surface of the bowl 1 above the heated stove or plate so that the contents of the bowl may be melted or heated without any tendency to cause scorching of the substance.

Figure 4 illustrates a modified form of no-scorch stirring spoon comprising a concave metal bowl 9 having integrally formed on the margin thereof a downwardly directed inclined supporting flange or rim 10 provided with a series of spaced apertures or openings 11 which may be of any desired shape. In this form of the stirring spoon, the rim 10 has the lower marginal edge thereof scalloped, as at 12, so that only spaced portions of the bottom edge of the rim 10 will contact a surface when the spoon bowl is disposed in a horizontal position within a cooking utensil or the like. In this form of the spoon, when the bowl is moved around in a horizontal position within a cooking utensil, the liquid or contents of the utensil may circulate through the openings provided between the scallops forming the edge of the rim or flange 10. While Figure 4 discloses a no-scorch spoon bowl having a scalloped flange or rim provided with the openings or apertures 11, it will, of course, be understood that the openings or apertures may be omitted, if desired, thereby allowing the circulation to take place between the scallops of the rim when the spoon bowl is supported on a surface and moved thereover.

For the purpose of operating the bowl 9, a straight inclined arm or stem 13 has the lower end thereof secured to the flange 10 closely adjacent the rear end of the bowl 9. Secured on the outer end of the arm or stem 13 is a wooden grip or handle 14.

In the form of the improved no-scorch stirring spoon illustrated in Figures 1 to 3, inclusive, the supporting edge of the rim 2 may be flatly seated upon a heated plate or surface to provide a chamber below the bowl 1 to concentrate the heat so as to heat the bowl without permitting the bowl to come into direct contact with the heated surface. While the rim 2 is shown provided with openings 3, it is to be understood that the rim may be of solid construction, omitting the apertures 3, when the spoon is to be used for certain other purposes.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. A stirring spoon comprising a bowl, a downwardly directed flange integrally formed entirely around the rim of the bowl, an arm secured to the downwardly directed flange and projecting therefrom at an angle with respect to the plane of the bowl, and a handle on said arm.

2. A stirring spoon comprising a bowl, an apertured downwardly directed flange integrally formed on the edge of said bowl, and a handle member connected with said apertured flange and projecting upwardly in an inclined direction with respect to the plane of the flange.

3. A mixing and stirring spoon comprising a bowl, an apertured downwardly inclined flange integrally formed on the margin of said bowl and of a width sufficient to hold the bottom of the bowl spaced above the plane of the lower edge of said flange, and a handle member connected with the flange.

4. A mixing and stirring spoon comprising a bowl, an apertured downwardly inclined flange integrally formed on the margin of said bowl and of a width sufficient to hold the bottom of the bowl spaced above the plane of the lower edge of said flange, and a handle member connected with the flange, said handle member being deflected at a plurality of points between the ends thereof to form an offset section in the handle member permitting the bowl of the spoon to be held in a horizontal position when being inserted in or removed from a container.

5. A mixing and stirring spoon comprising a bowl, a downwardly directed scalloped flange integrally formed entirely around the edge of said bowl, and a handle member connected with said flange.

6. A mixing and stirring spoon comprising a bowl, an apertured and scalloped inclined flange integrally formed on the bowl for holding the bowl spaced above the plane of the bottom of said flange, and a handle member connected with said flange and inclined with respect to the plane of said bowl.

7. A spoon of the class described including in combination a bowl unit comprising a concave bowl member and a supporting flange thereon for holding the bottom of the bowl member above the surface of a support on which the flange is seated, said flange being constructed for ventilating the space below the bowl member when the flange is seated on the support.

MARGARET HESS.